Patented June 1, 1943

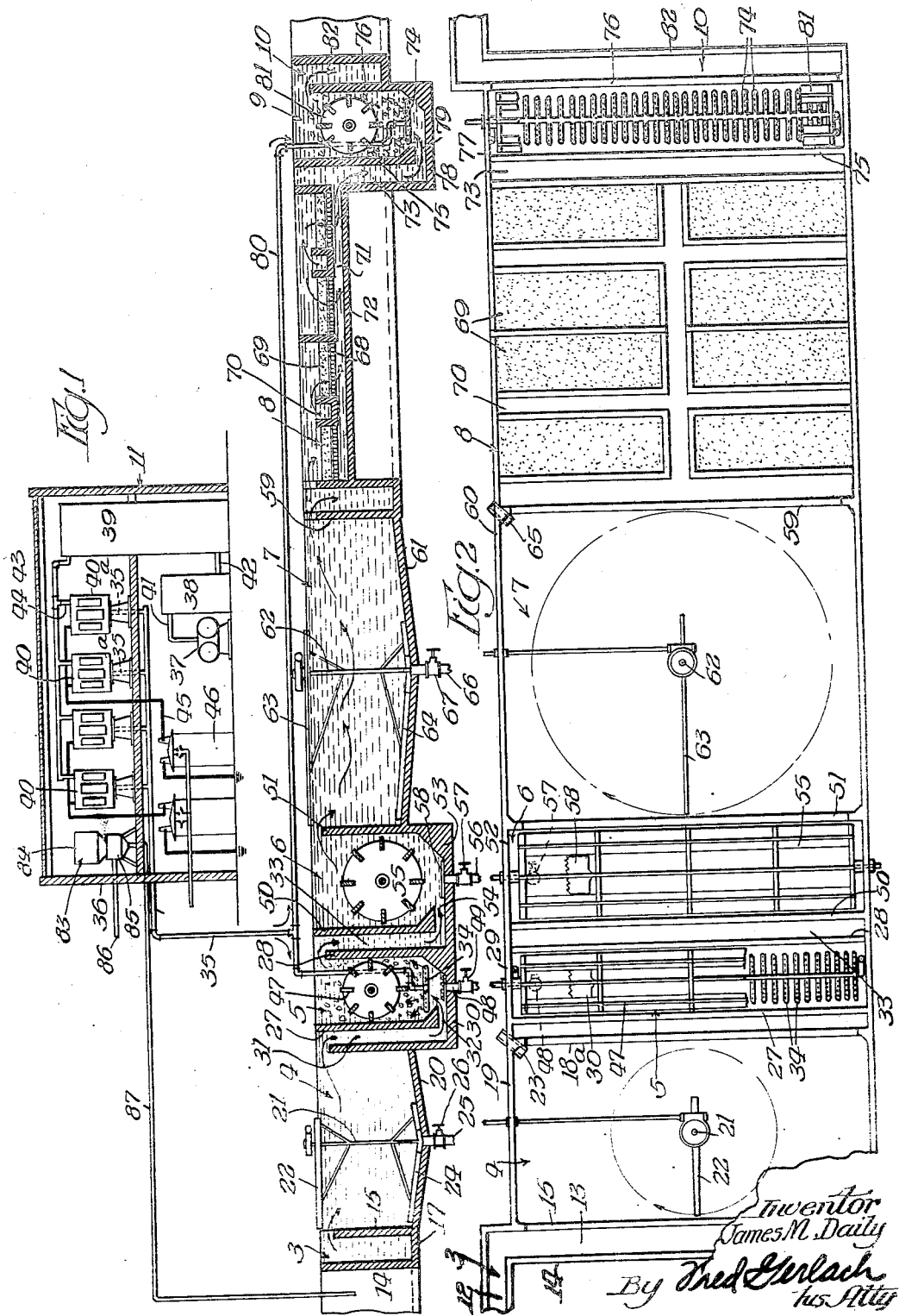

2,320,512

UNITED STATES PATENT OFFICE 2,320,512

APPARATUS FOR AND METHOD OF TREATING AND REMOVING SUSPENDED PARTICLES IN LIQUIDS

James M. Daily, Chicago, Ill., assignor to American Ozone Company, Chicago, Ill., a corporation of Illinois Application August 29, 1938, Serial No. 227,273

14 Claims. (Cl. 210—27)

The present invention relates to the removal of suspended particles in, and the treatment of, liquid and the primary object thereof is to provide an improved and novel apparatus for, and a method of, treating a body of liquid and removing the suspended particles therein by the use of ozonous and electrified air.

Other objects of the invention and the various advantages and characteristics of the present apparatus and method will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a vertical longitudinal section of an apparatus embodying the invention; and Figure 2 is a fragmentary plan view of the apparatus.

The apparatus which is shown in the drawing constitutes the preferred embodiment of the invention and is adapted primarily to remove suspended particles in a constantly moving body of liquid and also to stabilize, sterilize, bleach and deodorize the liquid. It has particular utility in connection with sewage and comprises as the main parts thereof an influent channel 3, a pre-settling basin 4, an ozonous and electrified air mixing and reaction tank 5, a flocculating tank 6, a main settling basin 7, a set or battery of filters 8, a secondary ozonous and electrified air mixing and reaction tank 9, and an effluent channel 10. In addition to the foregoing, the apparatus comprises a unit 11 for generating or producing the ozonous and electrified air which is delivered to, and is used in connection with, the tanks 5 and 9. The liquid to be treated is adapted, as hereinafter described, to flow successively and continuously through the influent channel 3, the pre-settling basin 4, the tanks 5 and 6, the main settling basin 7, the filters 8, the tank 9, and the effluent channel 10.

The influent channel 3 embodies an inlet end 12 and an outlet end 13, and is adapted to have the liquid to be treated flow therethrough from the liquid source. The outlet end 13 of the influent channel extends transversely of the apparatus, as shown in Figure 2, and comprises a pair of side walls 14 and 15, an end wall 16, and a bottom wall 17. The side wall 15 defines one of the sides of the presettling basin 4 and is of less height than the side wall 14 with the result that the liquid spills or flows thereover into said pre-settling basin.

The pre-settling basin 4 comprises a side wall 18, a pair of end walls 19, and a bottom wall 20. The end wall 18 is equal in height to, and is disposed in spaced relation from, the side wall 15 and is adapted to have the liquid spill or flow over it after passing through the basin 4. The end walls 19 of the pre-settling basin are equal in height to the side wall 14 and the end wall 16 of the outlet end of the influent channel 3. The liquid to be treated is adapted to flow slowly through the pre-settling basin so that any coarse particles tend to settle onto the basin bottom wall 20. As shown in Figure 2, the basin is substantially rectangular and the bottom wall is dished or concave. A power driven, vertically extending shaft 21 is disposed in the central portion of the basin 4 and is provided at the upper end thereof with a radially extending skimmer 22. This skimmer is mounted on the shaft 21 so that it is movable or rotatable over the surface of the liquid in the basin. During rotation of the shaft the skimmer skims any scum from the surface of the liquid in the basin and directs it to a scum discharging duct 23 at one corner of the basin. On its lower end the shaft 21 is provided with an inclined scraper 24. This scraper extends radially from the shaft and is located directly over the bottom wall 20 of the basin 4. During drive or rotation of the shaft 21 the scraper traverses the top face of the bottom wall 20 and moves to the center the various coarse particles which settle on the bottom. A discharge pipe 25 leads downwardly from the central portion of the bottom wall 20 and serves to conduct or convey away from the pre-settling basin the coarse particles which are accumulated in the central portion of the bottom wall by the action of the scraper 24. A valve 26 is included in the discharge pipe 25 so as to control the discharge of coarse particles from the basin. When an appreciable amount of particles is collected on the center of the bottom wall as the result of the action of the scraper 24 the valve 26 is opened so as to effect discharge of such particles by way of the discharge pipe 25. The pre-settling basin 4 is of such size that only the large or coarse particles are removed from the liquid as the latter flows through the basin.

The ozonous and electrified air mixing and reaction tank 5 is disposed between the flocculating tank 6 and the pre-settling basin 4 and comprises a pair of side walls 27 and 28, a pair of end walls 29. and a bottom wall 30. The side wall 27 is spaced from the side wall 18 of the pre-settling basin and forms with the latter a channel 31 into which the liquid flows from the pre-mixing basin. The lower margin of the wall 27 is spaced above the bottom wall 30 and forms an inlet passage 32 between the lower end of the channel 31 and the bottom of the tank 5. The end walls 29 of the tank 5 are joined to and are the same in height as the end walls 19 of the pre-settling basin 4. The side wall 28 extends upwardly from the bottom wall 30 and is of less height than the side wall 27 with the result that the liquid after traveling upwardly through the tank 5 spills thereover. The liquid after passing through the pre-settling tank 4 and having the coarse particles therein removed, as hereinbefore described, spills over the side wall 18 into the channel 31. After entering the channel, the liquid flows downwardly and thence through the inlet passage 32 into the bottom of the tank 5. After passing into the bottom of the tank the liquid flows upwardly at a comparatively low rate of speed and then after fully traversing the tank spills over the side wall 28 into a vertically extending channel 33. During upward passage of the liquid through the tank 5 the liquid is subjected to the action of ozonous and electrified air. Such air is produced in the unit 11 and is introduced into the bottom of the tank in bubble form by way of a porous diffuser 34. This diffuser extends substantially from one end wall of the tank 5 to the other and is connected to receive ozonous and electrified air from the unit 11 by way of a pipe 35. The unit 11 is located within a housing 36 in close proximity to the ozonous electrified air mixing and reaction tank 5 and comprises an air compressor 37, a condenser 38, a liquid brine bubble tower 39, and a battery or set of electric generators 40. The compressor is driven in any suitable manner and operates to draw air from atmosphere and to force it under pressure through the condenser 38, the tower 39, the generators 40 and the pipe 35 to the diffuser 34. It is of such capacity that it places the air under sufficient pressure to overcome the back pressure of the liquid in the ozonous and electrified air mixing and reaction tank 5 and also the resistance which is encountered in the generators and the various pipes and other parts of the unit. A pipe 41 extends between and serves to connect the pressure or outlet side of the compressor to the top of the condenser. The air under pressure is adapted to flow through the condenser and then into the lower end of the tower 39 by way of a pipe 42 between the lower ends of the condenser and the tower. In passing through the condenser, the air under pressure is cooled and rid of the major part of moisture therein. After passing through the pipe 42, the air under pressure rises to the top of the tower 39 and the latter, as well understood in the art, serves to remove the remainder of the moisture content of the air. The upper end of the tower is connected to the generators 40 by way of a pipe 43 and a set of branch pipes 44. The air under pressure after passing through the tower flows into the generator casings by way of the pipe 43 and the branch pipes 44. The generators are preferably the same in design and construction as that which forms the subject matter of United States Letters Patent No. 1,803,600, granted to me on May 5, 1931, although it is contemplated that other forms or types of generators may be employed. They embody spaced apart water cooled grounded electrodes and high tension electrodes and are adapted when in operation to produce a discharge from the high tension electrodes to the grounded electrodes and to form the air into ozonous and electrified air. The high tension electrodes are connected by suitable conductors 45 to a pair of high voltage transformers 46. The inlet end of the pipe 35 is connected by branch pipes 35ª to receive the ozonous and electrified air under pressure from the generators. When the unit 11 is in operation the air under pressure which is introduced into the generators via the branch pipes 44 is transformed into ozonous and electrified air and the latter flows under pressure via the branch pipes 35ª and the pipe 35 to the diffuser 34. From the diffuser the ozonous and electrified air flows upwardly through the tank 5 in the form of small bubbles. As the ozonous and electrified air passes or flows upwardly through the liquid in the tank it reacts with the various organic and inorganic particles in suspension in such manner that it tends to coagulate and flocculate the latter. As shown in Figure 2 of the drawing the diffuser is in the form of a horizontally extending header and a plurality of laterally spaced transversely extending horizontally disposed pipes. These pipes are rendered porous by way of minute holes and are of such capacity that during operation of the unit a sufficient amount of ozonous and electrified air is introduced into the liquid in the tank 5 in bubble form to effect the desired reaction with the suspended organic and inorganic particles whereby coagulation and flocculation of the particles are obtained. The pipes extend from one end wall of the tank 5 to the other and hence all of the liquid passing through the tank is subjected to the action of the ozonous and electrified air. By reason of the fact that the holes in the diffuser pipes are minute the ozonous and electrified air enters the tank 5 in a substantially quiescent or non-turbulent manner. In order to insure effective and efficient reaction of the ozonous and electrified air with the suspended particles in the liquid in the tank a paddle wheel 47 is provided. The latter is disposed in a horizontal position between the end walls 29 of the tank 5 and is journaled at its ends in suitable bearings. It is located directly above the diffuser 34, as shown in Figure 1, and is driven at a comparatively low speed by way of a motor and speed reducer (not shown). The wheel is adapted to be continuously and slowly driven during operation of the apparatus and operates to bring the ozonous and electrified air into such intimate and prolonged contact with the liquid that there is attained the desired reaction of the air with respect to the coagulation and flocculation of the suspended particles. Due to the low speed drive of the paddle wheel 47 no turbulence is set up in the tank 5 and consequently there is no possibility of any floc structure being broken up. Because some of the floc or flocculent substances become sufficiently heavy to settle on the bottom wall 30 of the ozonous and electrified air mixing and reaction tank, the bottom is provided at one end thereof with a downwardly extending discharge pipe 48. This pipe is provided with a valve 49 whereby it may be closed against the flow of liquid and settled flocculent substances therethrough. A scraper 30ª is located on the bottom wall 30 of the tank 5 and is adapted to be shifted manually lengthwise of the tank in order to direct the settled substances into the pipe 48. When the apparatus is in operation the liquid, as heretofore pointed out, flows into the bottom of the tank 5 through the inlet passage 32 and then flows slowly in an upward direction to the top of the tank and spills or passes over into the channel 33. As the liquid flows upwardly the bubbles of ozonous and electrified air emanating from the diffuser 34 come in contact with it and the suspended particles and react with the latter to effect coagulation and flocculation thereof. As the result of the action of the paddle wheel 47 the bubbles of ozonous and electrified air work slowly to the top of the tank and are brought into such contact with the liquid that the desired reaction is effected.

The flocculating tank 6 is disposed between the main settling basin 7 and the ozonous and electrified air mixing and reaction tank 5. It is the same in length as the tank 5 and comprises a pair of laterally spaced side walls 50 and 51, a pair of end walls 52, and a bottom wall 53. The end walls 52 join and are the same in height as the end walls 29 of the tank 5 and extend upwardly from the end margins of the bottom wall 53. The side wall 50 is disposed in spaced relation with the side wall 28 of the tank 5 and together with the latter defines the channel 33. The upper edge of the side wall 50 is coplanar with the upper edge of the side wall 27 of said tank 5, and the lower margin of the side wall 50 is spaced above the bottom wall 53 so as to define an inlet passage 54 between the lower end of the channel 33 and the bottom of the tank 6. The upper edge or margin of the side wall 51 is disposed beneath the top edge of the side wall 50 so that the liquid, after passing through the tank 6, spills over or flows into the main settling basin 7. An elongated horizontally extending paddle wheel 55 is disposed in the central portion of the tank 6 and extends from one end wall 52 to the other. It is journaled in suitable bearings in said end walls and is adapted to be driven by a motor and speed reducing gearing (not shown) at an extremely low speed. During drive of the paddle wheel 55, the coagulated or flocculent substances in the liquid passing upwardly through the tank 6, are brought into contact with one another and hence grow in size. The speed of drive of the paddle wheel 55 is so slow that there is no breaking up of the floc structure in the tank 6. In order to effect discharge of the coagulated and flocculent substances which settle onto the bottom wall 53 of the tank 6 a downwardly extending discharge pipe 56 is provided. This pipe extends through one end of the bottom wall 53 and is provided with a valve 57 for controlling purposes. A scraper 58 rests on the bottom wall 53 and is adapted to be manually or otherwise shifted lengthwise of the tank 6 in order to move the settled substances into or toward the discharge pipe 56. During use or operation of the apparatus the liquid after being subjected to the action of the ozonous and electrified air and the paddle wheel 47 in the tank 5 flows downwardly through the channel 33 and then enters the bottom of the tank 6 via the inlet passage 54 and flows upwardly and thence over the upper margin or edge of the side wall 51 into the main settling tank 7. As the liquid flows upwardly in the tank 6 it is subjected to the action of the paddle wheel 55. This paddle wheel 55, as heretofore pointed out, because of its slow speed drive, brings the collected or agglomerated particles, that is, the coagulated and flocculent substances together so as to produce a comparatively large floc formation. In the event that parts of the floc formation settle on the bottom 53 of the tank 6 the scraper 58 is moved or operated so as to direct such substances into the discharge pipe 56. The valve 57 is then opened so as to effect discharge.

The main settling basin 7 is located between the flocculating tank 6 and the filters 8. In this basin a large portion of the coagulated and flocculent substances are settled out. The basin, as shown in the drawing, comprises a side wall 59, a pair of end walls 60, and a downwardly dished or conical bottom wall 61. The end walls 60 are connected to, and are the same in height as, the end walls 52 of the flocculating tank 6 and extend upwardly from the bottom wall 61. The side wall 59 extends between the end wall 60 and is the same in height as the side wall 51 of the tank 6. Said side wall 51 serves as the other side of the basin 7. The latter basin is substantially square and has a greater capacity than the pre-settling basin 4 with the result that it takes longer for the liquid to flow through it than the basin 4. A vertically extending rotary motor driven shaft 62 is disposed in the central portion of the basin 7. This shaft carries at the upper end thereof a radially extending skimmer 63 and is provided at its lower end with a radially extending scraper 64. The skimmer during drive of the shaft is adapted to traverse the surface of the liquid in the basin 7 and to direct any scum into a scum discharging duct 65 at the upper end of one of the corners of the main settling basin. The scraper 64 is adapted during rotation or drive of the shaft 62 to transverse the top face of the bottom 61 and to direct the settled, coagulated and flocculent substances into a centrally disposed downwardly extending discharge pipe 66. The latter is located beneath the lower end of the shaft 62 and is provided with a valve 67 for controlling purposes. The shaft is adapted to be driven at an extremely slow speed so that the skimmer 63 and the scraper 64 will not break up the coagulated and flocculent substances in the liquid.

The filters 8 serve to rid the liquid of the coagulated and flocculent substances or matter which are too light to settle out in the main settling basin 7. They comprise foraminous beds 68 and batches 69 of sand or other filtering material on the beds. The liquid, after passing through the basin 7 wherein, as heretofore pointed out, the major portion of the coagulated and flocculent substances are settled out, is conducted by way of a channel structure 70 so that it flows over the filters. A horizontally extending passage 71 is formed under the filters by way of a wall 72. The liquid, after flowing through the channel structure 70 and then over the filters, passes through the sand batches 69 and the foraminous beds 68 into the passage 71. During flow of the liquid through the sand batches of the filters the light or fine suspended particles or flocculent substances are filtered from the liquid. From the passage 71 the liquid flows downwardly through an elongated transversely extending channel 73 into the secondary ozonous and electrified air mixing and reaction tank 9. When the apparatus is shut down or out of use, the filters may be cleaned by back-washing liquid or water therethrough or by any suitable mechanical means.

Into the tank 9 ozonous and electrified air is admitted by way of a porous diffuser 74 and the liquid as the result of being brought into contact with such air is sterilized, bleached and deodorized. In addition any putrescible substance or matter remaining in the liquid is effectively stabilized. The tank 9 is the same in design and construction as the tank 5. It comprises a pair of side walls 75 and 76, a pair of end walls 77 and a bottom wall 78. The side wall 75 defines one side of the channel 72 and is spaced slightly above the bottom wall 78, as shown in Figure 1, so as to form an inlet passage 79 for the liquid. The side wall 76 extends between and is connected to the end walls 77 and is so arranged that the liquid after passing through the tank 9 spills or flows thereover into the effluent channel 10. The liquid after being filtered by the filters 8 and then flowing through the passage 72 into the channel 73, passes into the bottom of the tank 9 via the inlet passage 79 and then flows upwardly through the tank and is finally discharged into the effluent channel 10. The diffuser 74 is located in the bottom of the tank 9 and is supplied with ozonous and electrified air under pressure by way of a pipe 80. The latter is connected to the pipe 35 and receives ozonous and electrified air from the unit 11. The bubbles of ozonous and electrified air emanating from the diffuser pass upwardly with the liquid in the tank 9 and sterilize, bleach and deodorize the liquid as well as clarify it. An elongated horizontally extending paddle wheel 81 is disposed in the central portion of the tank 9 and is journaled for rotation in suitable bearings in or on the end walls 77. It is adapted to be driven at a comparatively low speed by way of a motor and speed reducing gearing (not shown) and serves so intimately to mix the bubbles of ozonous and electrified air with the liquid that the desired sterilization, bleaching and deodorization of the liquid takes place. In addition to bringing the bubbles into intimate commingling relation with the liquid in the tank 9 the paddle wheel operates so to retard the upflow of the bubbles of air that the putrescible substances in the liquid are effectively stabilized and purified or sterilized. The effluent channel 10 is formed by the side wall 76 of the tank 9 and a vertically extending laterally spaced side wall 82.

The operation of the apparatus is as follows: The liquid to be treated, as hereinbefore described, flows constantly and at a slow rate into the influent channel 3 and then passes into the pre-settling basin 4. As the liquid flows through this basin the scum on the top surface thereof is removed by the action of the rotary skimmer 22 and the large or coarse suspended solids and other particles are permitted to settle on the bottom wall 20 of the basin. After being rid of the larger suspended particles as the result of the settling action which takes place within the pre-settling basin the liquid flows downwardly through the channel 31 and then upwardly through the tank 5. While passing upwardly through this tank the liquid is agitated by the paddle wheel 48 and brought into intimate contact with the ozonous and electrified air emanating from the diffuser 34. As the result of the action of the air and because of the agitation the suspended particles in the liquid are caused to coagulate and flocculate. After being treated in the tank 5 the liquid flows downwardly through the channel 33 and then inwardly and upwardly through the flocculating tank 6. In this tank the coagulated and flocculent substances are permitted to come together and grow as the result of the action of the paddle wheel 55. After passing through the tank 6 the liquid with its well defined floc structure flows over the upper margin of the side wall 51 of the tank 6 into the main settling basin 7. In this basin most of the coagulated and flocculent substances settle out and are removed by the action of the rotary skimmer 63. After passing through the main settling basin the liquid flows through the filters 8 and thence into the passage 71. During flow of the liquid through the filters any fine coagulated or flocculent substances which are too light to settle into the basin 7 are filtered out of the liquid. From the passage 71 the liquid flows downwardly to the channel 73 into and then upwardly through the tank 9. In this tank the liquid is brought into contact with the ozonous and electrified air and is sterilized, bleached and deodorized, as hereinbefore set forth. In practice it has been found that extremely satisfactory results are obtained as far as the treatment of sewage is concerned when the apparatus is of such size and the rate of flow of the sewage to be treated is such that the sewage remains in the pre-settling basin 4 for about thirty minutes, in the ozonous and electrified air mixing and reaction tank 5 for from ten to fifteen minutes, in the flocculating tank 6 for from fifteen to twenty minutes, in the main settling basin 7 for approximately one and one-half hours, and in the secondary ozonous and electrified air mixing and reaction tank 9 for from ten to fifteen minutes.

In order to add weight to the coagulated and flocculent substances for settling purposes a device 83 for introducing into the liquid a metal salt such as iron salt is provided. This device comprises a container 84 in the housing 36 of the unit 11 and a hydrating tank 85 beneath the container. The container is adapted to be charged with the salt to be introduced into the liquid and is provided with a mechanical feed device (not shown) for feeding the salt in measured quantities into the hydrating tank 85. The latter is supplied with water through the medium of pipe 86 and is adapted to discharge into the influent channel 3 by way of a pipe 87. During operation of the apparatus the device serves to introduce into the liquid a small amount of the salt. This salt when brought into contact with the ozonous and electrified air in the tank 5 produces such reaction that the coagulated and flocculent substances are increased in size and weight and are hence in a condition to be readily settled.

The herein described apparatus is extremely efficient and effectively fulfills its intended purpose. It has a comparatively large capacity for its size because of the action of the tanks 5 and 9 and is readily controllable. The apparatus is particularly adapted for sewage treatment although it may be used with other liquids to remove the suspended particles or substances therein and also to sterilize, bleach and deodorize the liquid.

The invention is not to be understood as restricted to the details set forth, since these may be modified within the scope of the appended claims, without departing from the spirit and scope of the invention.

Having thus described the invention, what I claim as new and desire to secure by Letters Patent is:

1. An apparatus for treating liquid with particles suspended therein, comprising a tank for the liquid, a source of ozonous and electrified air under pressure, a diffuser in the tank connected to receive said air from the source and provided with minute holes therein whereby the air received by the diffuser is caused to enter the liquid in the form of minute bubbles and without producing any appreciable turbulence, and effect coagulation and flocculation of the suspended particles, and means for removing the coagulated and flocculated particles from the liquid.

2. An apparatus for treating liquid having particles in suspension therein, comprising a tank adapted to have the liquid flow slowly therethrough, a source of ozonous and electrified air under pressure, a diffuser in the bottom of the tank connected to receive said air from the source and provided with minute holes therein whereby the air received by the diffuser is caused to enter the liquid in the form of minute bubbles and without producing any appreciable turbulence effect coagulation and flocculation of the suspended particles, and means for removing the coagulated and flocculated particles from the liquid after passage of the latter through said tank.

3. An apparatus for treating liquid with particles suspended therein, comprising a tank adapted to have the liquid flow therethrough, means for generating ozonous and electrified air under pressure, a diffuser in the bottom of the tank connected to receive said air from the generating means and provided with minute holes therein whereby the air received by the diffuser is caused to enter the liquid in the form of minute bubbles and without producing any appreciable turbulence, and effect coagulation and flocculation of the suspended particles, means in the tank above said diffuser for slowly agitating the liquid in said tank without producing appreciable turbulence in order to bring the bubbles into intimate contact with the liquid and particles and retard their upward flow through said liquid, and means for removing the coagulated and flocculated particles from the liquid after flow of the latter through the tank.

4. An apparatus for treating liquid having particles in suspension therein, comprising in combination a tank adapted to have the liquid flow slowly therethrough, a source of ozonous and electrified air under pressure, a diffuser in the tank connected to receive said air from the source and provided with minute holes therein whereby the air received by the diffuser is caused to enter the liquid in the form of minute bubbles and without producing any appreciable turbulence, and effect coagulation and flocculation of the suspended particles, a flocculating tank of greater capacity than the first mentioned tank connected to receive the liquid from the latter and adapted to have the liquid flow slowly therethrough, a power driven agitator disposed in the flocculating tank and adapted slowly to agitate the liquid as it flows through the latter in order to cause the coagulated and flocculated masses to increase in size, and means for removing the coagulated and flocculated masses from the liquid after passage of the latter through said flocculating tank.

5. An apparatus for treating liquid having particles in suspension therein, comprising in combination a tank adapted to have the liquid flow slowly therethrough, a source of ozonous and electrified air under pressure, a diffuser in the tank connected to receive said air from the source and provided with minute holes therein whereby the air received by the diffuser is caused to enter the liquid in the form of minute bubbles and without producing any appreciable turbulence, and effect coagulation and flocculation of the suspended particles, and a settling basin of comparatively large capacity arranged and adapted to receive the liquid after flow thereof through the tank and to have it flow so slowly therethrough that the coagulated and flocculated particles settle out, and provided with means for discharging the settled out coagulated and flocculated particles therefrom.

6. An apparatus for treating liquid having particles in suspension therein, comprising in combination a tank adapted to have the liquid flow slowly therethrough, means for generating ozonous and electrified air under pressure, a diffuser in the tank connected to receive said air from the generating means and provided with minute holes therein whereby the air received by the diffuser is caused to enter the liquid in the form of minute bubbles and without producing any appreciable turbulence, and to effect coagulation and flocculation of the suspended particles, a flocculating tank connected to receive the liquid from the first mentioned tank and adapted to have said liquid flow slowly therethrough, a power driven agitator disposed in the flocculating tank and adapted slowly to agitate the liquid as it flows through the latter in order to cause the coagulated and flocculated masses to increase in size, and a settling basin of greater capacity than either of the tanks arranged to receive the liquid from the flocculating tank and to have it flow slowly therethrough so that the coagulated and flocculent masses settle out, and provided with means for discharging the settled out masses therefrom.

7. An apparatus for treating liquid with particles suspended therein, comprising in combination a tank adapted to have the liquid flow slowly therethrough, a source of ozonous and electrified air under pressure, a diffuser in the tank connected to receive said air from the source and provided with minute holes therein whereby the air received by the diffuser is caused to enter the liquid in the form of minute bubbles and without producing any appreciable turbulence, and effect coagulation and flocculation of the suspended particles, a settling basin of comparatively large capacity arranged to receive the liquid after it flows through the tank and to have it flow slowly therethrough so that the majority of the coagulated and flocculated particles settles out, and provided with means for discharging the settled out particles therefrom, and means for filtering the liquid after passage thereof through the basin so as to remove the remainder of the coagulated and flocculated particles.

8. An apparatus for treating liquid having particles in suspension therein, comprising in combination a tank adapted to have the liquid flow slowly therethrough, means for generating ozonous and electrified air under pressure, a diffuser in the bottom of the tank connected to receive said air from the generating means and provided with minute holes therein whereby the air received by the diffuser is caused to enter the liquid in the form of minute bubbles and without producing any appreciable turbulence, and effect coagulation and flocculation of the suspended particles, a flocculating tank connected to receive the liquid from the first mentioned tank and adapted to have said liquid flow slowly therethrough, a power driven agitator disposed in the flocculating tank and adapted slowly to agitate the liquid as it flows through the latter in order to cause the coagulated and flocculated masses to increase in size, a settling basin of larger capacity than either of the tanks and arranged to receive the liquid from the flocculating tank and to have it flow so slowly therethrough that the majority of said masses settles out, and provided with means for discharging the settled out masses therefrom, and means for filtering the liquid after passage of the latter through the basin in order to filter out any remaining coagulated and flocculent masses in the liquid.

9. An apparatus for treating liquid with particles suspended therein, comprising in combination a tank for the liquid, a source of ozonous and electrified air under pressure, a diffuser in the tank connected to receive said air from the source and provided with minute holes therein whereby the air received by the diffuser is caused to enter the liquid in the form of minute bubbles and without producing any appreciable turbulence, and effect coagulation and flocculation of the suspended particles, means for removing the coagulated and flocculated particles from the liquid, a tank adapted to receive the liquid after removal of said particles, and means for introducing into the liquid while the latter is in the last mentioned tank ozonous and electrified air from said source in order to sterilize, bleach and deodorize the liquid.

10. An apparatus for treating liquid with particles suspended therein, comprising in combination a tank adapted to have the liquid flow slowly therethrough, means for generating ozonous and electrified air under pressure, a diffuser in the bottom of the tank connected to receive such air from the generating means and provided with minute holes therein whereby the air received by the diffuser is caused to enter the liquid in the form of minute bubbles and without producing any appreciable turbulence, and effect coagulation and flocculation of the suspended particles, a settling basin of a comparatively large capacity arranged to receive the liquid from the tank and to have it flow slowly therethrough so that the coagulated and flocculated particles settle out, and provided with means for discharging the settled out particles therefrom, a second tank arranged to receive the liquid from the basin and to have it flow slowly therethrough, and means for introducing into the liquid in said second tank ozonous and electrified air from said generating means in order to sterilize, bleach and deodorize the liquid.

11. An apparatus for treating liquid with particles suspended therein, the combination of a tank adapted to have the liquid flow slowly therethrough, means for generating ozonous and electrified air under pressure, a diffuser in the tank connected to receive said air from the generating means provided with minute holes therein whereby the air received by the diffuser is caused to enter the liquid in the form of minute bubbles and without producing any appreciable turbulence, and effect coagulation and flocculation of the suspended particles, a settling basin of comparatively large capacity arranged to receive the liquid from the tank and to have it flow slowly therethrough so that the majority of the coagulated and flocculated particles settles out, and provided with means for discharging the settled out particles therefrom, means connected to the settling basin to receive the liquid therefrom and adapted and designed to filter out any remaining coagulated flocculated particles in the liquid, a tank connected to the filtering means to receive the liquid therefrom, and means for introducing into the second tank ozonous and electrified air under pressure from said generating means in order to sterilize, bleach and deodorize the filtered liquid.

12. That improvement in treating liquid with particles suspended therein which comprises first introducing into the liquid by way of pressure and without producing any appreciable turbulence numerous minute bubbles of ozonous and electrified air in order to coagulate and flocculate the particles by reaction with them, and then removing the coagulated and flocculated particles from the liquid.

13. That improvement in treating liquid with particles suspended therein which comprises first introducing into the liquid by way of pressure and without producing any appreciable turbulence numerous minute bubbles of ozonous and electrified air in order to coagulate and flocculate the particles, then settling out the coagulated and flocculated particles and removing them from the liquid, and then after the settling out step introducing into the liquid ozonous and electrified air under pressure in order to sterilize, bleach and deodorize the liquid.

14. That improvement in treating liquid with particles suspended therein which comprises first introducing into the liquid by way of pressure and without producing any appreciable turbulence numerous minute bubbles of ozonous and electrified air in order to coagulate and flocculate the particles by reaction with them, then settling out the coagulated and flocculated particles and removing them from the liquid, then filtering the liquid to remove any remaining coagulated particles therefrom, and finally after the filtering step introducing into the liquid ozonous and electrified air under pressure in order to sterilize, bleach and deodorize it.

JAMES M. DAILY.